United States Patent
Clark

(10) Patent No.: US 8,828,463 B2
(45) Date of Patent: Sep. 9, 2014

(54) PACKAGING OF RESPIRING BIOLOGICAL MATERIALS

(75) Inventor: Raymond Clark, Los Altos, CA (US)

(73) Assignee: Apio, Inc.

( * ) Notice: Subject to any disclaimer, the term of this patent is extended or adjusted under 35 U.S.C. 154(b) by 0 days.

(21) Appl. No.: 13/368,216

(22) Filed: Feb. 7, 2012

(65) Prior Publication Data

US 2012/0135114 A1 May 31, 2012

Related U.S. Application Data

(63) Continuation of application No. 09/858,190, filed on May 15, 2001, now Pat. No. 8,110,232.

(60) Provisional application No. 60/325,762, filed on May 26, 2000.

(51) Int. Cl.
*A23B 7/148* (2006.01)

(52) U.S. Cl.
USPC ........... 426/106; 426/118; 426/112; 426/418; 426/35.2; 426/34.7; 426/35.4

(58) Field of Classification Search
USPC ........ 426/106, 118, 112, 418; 428/35.2, 34.7, 428/137, 35.4
See application file for complete search history.

(56) References Cited

U.S. PATENT DOCUMENTS

| | | | | |
|---|---|---|---|---|
| 5,332,088 A | * | 7/1994 | Schreiber | 206/774 |
| 5,460,841 A | * | 10/1995 | Herdeman | 426/263 |
| 5,616,354 A | * | 4/1997 | Tompkins et al. | 426/324 |
| 6,013,293 A | * | 1/2000 | De Moor | 426/106 |
| 6,085,930 A | * | 7/2000 | Curtis | 220/371 |
| 6,348,271 B1 | * | 2/2002 | Nakata et al. | 428/500 |

* cited by examiner

*Primary Examiner* — Drew Becker
*Assistant Examiner* — Preston Smith
(74) *Attorney, Agent, or Firm* — Tim Richardson; James McDonald

(57) ABSTRACT

Packaging of bananas in containers, for example polyethylene bags, having designed permeabilities to oxygen, carbon dioxide, and ethylene. The bags preferably include a gas-permeable membrane comprising (1) a microporous film, and (2) a polymeric coating on the microporous film. The containers enable storage and/or ripening of bananas under controlled conditions. Using the new containers, bananas can be ripened while they are being transported, or in conventional ripening rooms without opening the containers in which they have been transported, or after they have left a ripening room. In addition, bananas can be preserved in a satisfactory ripened state for longer periods of time.

22 Claims, No Drawings

US 8,828,463 B2

PACKAGING OF RESPIRING BIOLOGICAL MATERIALS

CROSS-REFERENCE TO RELATED APPLICATIONS

This application is a continuation of co-pending, commonly assigned, application Ser. No. 09/858,190, filed May 15, 2001. Ser. No. 09/858,190 claims priority under 37 CFR 1.78 (a)(5) from Provisional Application Ser. No. 60/325,762, filed May 26, 2000, which resulted from the conversion of application Ser. No. 09/580,379, into a provisional application under 37 CFR 1.53 (c) (2). This application is also related to (1) application Ser. No. 09/989,682, filed Nov. 20, 2001, now U.S. Pat. No. 7,601,374, which is a continuation-in-part of Ser. No. 09/858,190, and (2) application Ser. No. 12/553,852 filed Sep. 3, 2009, now U.S. Pat. No. 8,092,848, which is a divisional of Ser. No. 09/989,682. The entire disclosure of each of those patents and applications is incorporated herein by reference for all purposes.

BACKGROUND OF THE INVENTION

Respiring biological materials consume oxygen ($O_2$) and produce carbon dioxide ($CO_2$) at rates which depend upon temperature and the stage of their development. Ideally, a respiring material should be stored in a container whose permeability to $O_2$ and $CO_2$ is correlated with (i) the atmosphere outside the package, (ii) the rates at which the material consumes $O_2$ and produces $CO_2$, and (iii) the temperature, to produce the desired atmosphere within the container. This is the principle behind the technology of modified atmosphere packaging (MAP), as discussed, for example, in U.S. Pat. No. 3,450,542 (Badran), U.S. Pat. No. 3,450,544 (Badran et al.), U.S. Pat. No. 3,798,333 (Cummin et al. U.S. Pat. No. 4,734,324 (Hill), U.S. Pat. No. 4,830,863 (Jones), U.S. Pat. No. 4,842,875 (Anderson), U.S. Pat. No. 4,879,078 (Antoon), U.S. Pat. No. 4,910,032 (Antoon), U.S. Pat. No. 4,923,703 (Antoon), U.S. Pat. No. 5,045,331 (Antoon), U.S. Pat. No. 5,160,768 (Antoon), U.S. Pat. No. 5,254,354 (Stewart), U.S. Pat. No. 6,013,293 (De Moor), U.S. Pat. No. 6,376,032 (Clarke) and U.S. Pat. No. 6,548,132 (Clarke), International Publication Numbers WO 94/12040 (Fresh Western), WO 96/38495 (Landec) and WO 00/04787 (Landec), and European Patent Applications Nos. 0,351,115 and 0,351,116 (Courtaulds). The disclosure of each of these patents, applications and publications is incorporated herein by reference.

Bananas are respiring biological materials whose storage and ripening present the most serious problems because
  (i) bananas are grown in locations far distant from the locations at which they are consumed;
  (ii) they are damaged by storage at temperatures below about 14.4° C., with the extent of the damage depending upon the time spent below that temperature and how far the temperature is below 14.4° C. (58° F.);
  (iii) they go through a climacteric when they ripen, thus producing a very large increase in respiration rate and the generation of heat;
  (iv) they generate ethylene as they ripen, and they ripen at a rate which increases with the concentration of ethylene around them—as a result, a single prematurely ripe banana can trigger premature ripening of many others; and
  (iv) once they have ripened, and have been exposed to air, they rapidly become over-ripe.
These problems have not yet been solved. The conventional procedure is to harvest the bananas when they are hard, green and unripe; to transport the green bananas, at 13-14° C., to the location where they will be consumed; to ripen the green bananas by exposing them to ethylene in a ripening room at that location; and to place the ripened bananas on sale. The time at which the bananas are harvested depends on the time needed to transport them to the point-of-sale. Thus bananas are typically harvested at week 11 (i.e. 11 weeks after the flower emerges from the plant) or week 12. The green bananas are shipped in bags made of polyethylene about 0.04 to 0.06 mm (1.5-2.5 mil) thick, with each bag containing about 18 kg (40 lb) of bananas and being supported by a cardboard box. In many cases, after the bananas have been placed in the bag, most of the air is exhausted from the bag, and the bag is then sealed; this is the procedure generally described in U.S. Pat. No. 3,450,542 (Badran). In other cases, the bag contains vent holes.

A serious disadvantage of the conventional procedure is the need to harvest the bananas a good while before they are fully grown. It would be desirable to harvest the bananas at a later time, when they are larger. However, the later the bananas are picked, the greater the propensity for their climacteric to be triggered by small concentrations of ethylene, and experience has shown that if the bananas are harvested later than the presently established timetables, this results in prematurely ripe bananas when the bananas are shipped in vented bags, and in so-called "green-ripe" bananas when the bananas are shipped in sealed bags. Green-ripe bananas soften, but remain green, and have an unpleasant flavor.

Another serious disadvantage of the conventional procedure is that, in order to ripen the green bananas by exposing them to ethylene, it is necessary to open each of the shipping bags if, as in most cases, the bags have been sealed during shipping.

Another serious disadvantage of the conventional procedure is that the bananas, once ripened, must be sold within a few days, or scrapped.

Another serious disadvantage of the conventional procedure is that the heat generated by the ripening of the bananas is generated over a relatively short period of time, which heats the bananas to an extent that causes dehydration of the bananas and/or increases the demand on the refrigeration equipment used to keep the bananas cool.

SUMMARY OF THE INVENTION

The present invention mitigates or overcomes one or more of these disadvantages by packaging bananas in a container having designed permeabilities to oxygen ($O_2$), carbon dioxide ($CO_2$) and ethylene. Some embodiments of the invention make it possible to maintain bananas, before and/or after their climacteric in a packaging atmosphere which enables storage and/or ripening of green bananas in a controlled fashion. Other embodiment of the invention make it possible to store bananas, after their climacteric, within a desired range of color stages (e.g. within the range most attractive for retail sale) for a longer period than is possible under conventional practice.

In a first aspect, this invention provides a sealed package which comprises
  (a) a sealed container, for example a bag, particularly a polyethylene bag, and
  (b) within the sealed container, (i) bananas, for example bananas which have been exposed to ethylene in a ripening room, and (ii) a packaging atmosphere around the bananas, preferably a packaging atmosphere which contains 1.5 to 6% of oxygen and less than 15% of carbon dioxide, with the total quantity of oxygen and carbon dioxide being less than 16%.

The sealed container preferably comprises at least one atmosphere control member which provides a pathway for oxygen, carbon dioxide and ethylene to enter or leave the packaging atmosphere. The sealed container preferably has an oxygen permeability at 13° C. per kilogram of bananas in the container (OP13/kg) of at least 700, preferably at least 1000, particularly at least 1500, ml/atm.24 hrs, an ethylene permeability at 13° C. per kilogram of bananas in the container (EtP13/kg) which is at least 2 times, preferably at least 3 times the OP13/kg and an R ratio at 13° C. of at least 2.

The atmosphere control member can be any of the atmosphere control members disclosed in the documents incorporated by reference herein, including porous substrates having a coating of a polymer thereon and perforated films. For example, European Patent Application 035-1115 discloses a polymeric film containing perforations having a mean diameter of not more than 100μ, and preferably from 40 to 60μ, with a frequency of the perforations usually be not more than 1000 per square meter, generally at least 10 per square meter. In a preferred embodiment of the invention the atmosphere control member comprises (1) a microporous film, and
(2) a polymeric coating on the microporous film;

for example as described in one or more of U.S. Pat. Nos. 6,013,293, 6,376,032 and 6,548,132, which are incorporated by reference herein.

U.S. Pat. No. 6,376,032 discloses that a membrane which comprises a microporous film and a polymeric coating on the microporous film, the membrane having an oxygen permeability (OTR), at all temperatures between 20° and 25° C., of at least 50,000 cc/100 inch$^2$ .atm.24 hrs, for example 50,000 to 500,000 cc/100 inch$^2$ .atm.24 hrs, preferably 100,000 to 250,000 cc/100 inch$^2$ .atm.24 hrs, particularly at least 150,000 cc/100 inch$^2$ .atm.24 hrs. U.S. Pat. No. 6,376,032 discloses that this membrane can be used to control the atmosphere within a sealed container whose walls are relatively impervious to gases except over one or more control sections which are provided by such a membrane, and that the membrane can extend across a complete dimension of the sealed container. U.S. Pat. No. 6,376,032 also discloses that the size of the container can vary considerably and can contain for example up to 1500 lb (680 kg) of produce.

Different aspects of the invention make it possible to ripen bananas in a sealed container, for example in a conventional ripening room or while the bananas are being transported; and/or to harvest bananas at a later time than is now possible; and/or to preserve bananas in a satisfactory ripened state for longer than is now possible.

The sealed packages of the invention can have one or more of the following characteristics.
(1) The package contains at least 4 kg, preferably at least 15 kg, especially 16 to 22 kg, of the bananas.
(2) The package contains 1 to 2.5 kg of the bananas.
(3) The container has an R ratio at 13° C. of at least 3.
(4) The container has an EtOP13/kg which is at least 4 times the OP13/kg.
(5) The container has an O$_2$ permeability at 13° C., per kg of bananas in the container (OP13/kg), of at least 700, preferably at least 1000, particularly at least 1500, ml/atm.24 hrs.

In a second aspect, this invention provides a method of ripening green bananas which comprises
(A) providing a sealed package which comprises
   (a) a sealed container, e.g. a polyethylene bag, and
   (b) within the sealed container, (i) bananas and (ii) a packaging atmosphere around the bananas;
the sealed polyethylene bag comprising at least one atmosphere control member which provides a pathway for oxygen, carbon dioxide and ethylene to enter or leave the packaging atmosphere; and
the sealed polyethylene bag having an oxygen permeability at 13° C. per kilogram of bananas in the polyethylene bag (OP13/kg) of at least 1500 ml/atm.24 hrs, an ethylene permeability at 13° C. per kilogram of bananas in the container (EtP13/kg) which is at least 3 times the OP13/kg and an R ratio at 13° C. of at least 2.
(B) placing the sealed package in an atmosphere containing ethylene.

In a third aspect, this invention provides a method of ripening green bananas which comprises
(A) placing, in a sealable container, e.g. a polyethylene bag,
   (a) the green bananas, and
   (b) a source of ethylene;
(B) sealing the container around the green bananas and the source of ethylene, thus providing a sealed package which comprises
   (a) a sealed container, and
   (b) within the sealed polyethylene bag, the green bananas, the source of ethylene, and a packaging atmosphere around the green bananas;
the sealed container having an O$_2$ permeability at 13° C., per kg of bananas in the container (OP13/kg), of at least 700, preferably at least 1000, particularly at least 1500, ml/atm.24 hrs, an R ratio at 13° C. of at least 2, preferably at least 3, and an ethylene permeability at 13° C., per kg of bananas in the container (EtOP13/kg) which is at least 3 times, preferably at least 4 times, the OP13/kg of the container; and
(C) exposing the bananas in the sealed package to ethylene from the source of ethylene in the sealed container.

In a fourth aspect, this invention provides a method of storing green bananas which comprises
(A) providing a sealed package which comprises
   (a) a sealed container, e.g. a sealed polyethylene bag, and
   (b) within the sealed container, (i) bananas which have been exposed to ethylene in a ripening room, and (ii) a packaging atmosphere around the bananas which contains 1.5 to 6% of oxygen and less than 15% of carbon dioxide, with the total quantity of oxygen and carbon dioxide being less than 16%;
the sealed container comprising at least one atmosphere control member which provides a pathway for oxygen, carbon dioxide and ethylene to enter or leave the packaging atmosphere; and
the sealed container having an oxygen permeability at 13° C. per kilogram of bananas in the container (OP13/kg) of at least 700, preferably at least 1000, particularly at least 1500, ml/atm.24 hrs, an ethylene permeability at 13° C. per kilogram of bananas in the container (EtP13/kg) which is at least 2 times, preferably at least 3 times the OP13/kg and an R ratio at 13° C. of at least 2; and
(B) maintaining the sealed container at a temperature of 13-18° C.

In a fifth aspect, this invention provides a package which is stored in air and which comprises
(a) a sealed container, e.g. a sealed polyethylene bag, and
(b) within the sealed container, (i) 1 to 2.5 kg of bananas which are at a color stage less than 5 and which have been exposed to ethylene in a ripening room, and (ii) a packaging atmosphere around the bananas which contains 1.5 to 6%, e.g. 1.5 to 3%, of oxygen and less than 15%, e.g. less than 7% of carbon dioxide, with the total quantity of oxygen and carbon dioxide being less than 16%, e.g. less than 10%;

the sealed container comprising at least one atmosphere control member which provides a pathway for oxygen, carbon dioxide and ethylene to enter or leave the packaging atmosphere; and the sealed polyethylene bag having an oxygen permeability at 13° C. per kilogram of bananas in the container (OP13/kg) of at least 700, preferably at least 1000, particularly at least 1500, ml/atm.24 hrs, an ethylene permeability at 13° C. per kilogram of bananas in the container (EtP13/kg) which is at least 2 times, preferably at least 3 times the OP13/kg and an R ratio at 13° C. of at least 2.

In a sixth aspect, this invention provides a method of ripening green bananas which comprises
(A) placing, in a sealable container, e.g. a polyethylene bag
   (a) the green bananas, and
   (b) a source of ethylene;
(B) sealing the container around the green bananas and the source of ethylene, thus providing a sealed package which comprises
   (a) a sealed container, and
   (b) within the sealed container, the green bananas, the source of
      ethylene, and a packaging atmosphere around the green bananas; the sealed container comprising at least one atmosphere control member which is provides a pathway for oxygen, carbon dioxide and ethylene to enter or leave the packaging atmosphere; and
the sealed container having an oxygen permeability at 13° C. per kilogram of bananas in the container (OP13/kg) of at least 700, preferably at least 1000, particularly at least 1500, ml/atm.24 hrs, an ethylene permeability at 13° C. per kilogram of bananas in the container (EtP13/kg) which is at least 2 times, preferably at least 3 times the OP13/kg and an R ratio at 13° C. of at least 2.

DETAILED DESCRIPTION OF THE INVENTION

In the Summary of the Invention above and in the Detailed Description of the Invention, the Examples, and the Claims below, reference is made to particular features of the invention. It is to be understood that the disclosure of the invention in this specification includes all appropriate combinations of such particular features. For example, where a particular feature is disclosed in the context of a particular aspect or embodiment of the invention, or a particular claim, that feature can also be used, to the extent appropriate, in the context of other particular aspects and embodiments of the invention, and in the invention generally.

In describing and claiming the invention below, the following abbreviations, definitions, and methods of measurement are used. OTR is $O_2$ permeability. COTR is $CO_2$ permeability. EtTR is ethylene transmission rate. OTR, COTR and EtTR values are given in ml/m$^2$.atm.24 hrs; in some cases, the equivalent in cc/100 inch$^2$.atm.24 hrs is given in parentheses. OTR and COTR values referred to herein can be measured using a permeability cell (supplied by Millipore) in which a mixture of $O_2$, $CO_2$ and helium is applied to the sample, using a pressure of 0.7 kg/cm$^2$ (10 psi) except where otherwise noted, and the gases passing through the sample were analyzed for $O_2$ and $CO_2$ by a gas chromatograph. The cell could be placed in a water bath to control the temperature. The abbreviation $P_{10}$ is used to denote the ratio of the oxygen permeability at a first temperature $T_1$° C. to the oxygen permeability at a second temperature $T_2$, where $T_2$ is $(T_1-10)$° C., $T_1$ being 10° C. and $T_2$ being 0° C. unless otherwise noted. The abbreviation R or R ratio is used to denote the ratio of $CO_2$ permeability to $O_2$ permeability, both permeabilities being measured at 20° C. unless otherwise noted. Pore sizes given in this specification are measured by mercury porosimetry or an equivalent procedure. Parts and percentages are by weight, except for percentages of gases, which are by volume; temperatures are in degrees Centigrade, and molecular weights are weight average molecular weights expressed in Daltons. For crystalline polymers, the abbreviation $T_o$ is used to denote the onset of melting, the abbreviation $T_p$ is used to denote the crystalline melting point, and the abbreviation $\Delta H$ is used to denote the heat of fusion. $T_o$, $T_p$ and $\Delta H$ are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

Where reference is made herein to sealing containers containing bananas, it is to be understood that the sealing can be, but generally is not, hermetic sealing. Conventional methods for sealing bags of bananas can conveniently be used in this invention. Such conventional methods include, for example, the use of a cable tie to seal the neck of the bag. A seal made by conventional methods is not a hermetic seal, and has the advantage that it permits equilibration of the pressures inside and outside the bag. If the container is sealed hermetically, it will generally be desirable for the container to include one or more pinholes which are sufficiently large to achieve such equilibration (i.e. which will not function as an atmosphere control member).

Control Members

As noted above, this invention preferably makes use of an atmosphere control member comprising (a) a microporous polymeric film, and (b) a polymeric coating on the microporous film. The microporous polymeric film preferably comprises a network of interconnected pores having an average pore size of less than 0.24 micron, with at least 70% of the pores having a pore size of less than 0.24 micron. Preferably the pores in the microporous film constitute 35 to 80% by volume of the microporous film. Preferred microporous films comprise a polymeric matrix comprising (i) an essentially linear ultrahigh molecular weight polyethylene having an intrinsic viscosity of at least 18 deciliters/g, or (ii) an essentially linear ultrahigh molecular weight polypropylene having an intrinsic viscosity of at least 6 deciliters/g, or (iii) a mixture of (i) and (ii). The microporous film may contain 30 to 90% by weight, based on the weight of the film, of a finely divided particulate substantially insoluble filler which is distributed throughout the film. A preferred process for preparing suitable microporous films comprises
(A) preparing a uniform mixture comprising the polymeric matrix material in the form of a powder, the filler, and a processing oil;
(B) extruding the mixture as a continuous sheet;
(C) forwarding the continuous sheet, without drawing, to a pair of heated calender rolls;
(D) passing the continuous sheet through the calender rolls to form a sheet of lesser thickness;
(E) passing the sheet from step (D) to a first extraction zone in which the processing oil is substantially removed by extraction with an organic extraction liquid which is a good solvent for the processing oil, a poor solvent for the polymeric matrix material, and more volatile than the processing oil;
(F) passing the sheet from step (E) to a second extraction zone in which the organic extraction liquid is substantially removed by steam or water or both; and (G) passing the sheet from step (F) through a forced air dryer to remove residual water and organic extraction liquid.

The polymeric coating on the control member preferably comprises a crystalline polymer having a peak melting temperature Tp of −5 to 40° C., e.g. 0 to 15° C., or 10 to 20° C., an onset of melting temperature $T_o$ such that $(T_p-T_o)$ is less than 10° C., and a heat of fusion of at least 5 J/g. The polymer preferably comprises a side chain crystalline polymer moiety comprising, and optionally consisting of, units derived from (i) at least one n-alkyl acrylate or methacrylate (or equivalent monomer, for example an amide) in which the n-alkyl group contains at least 12, preferably at least 14, for example 16-50, preferably 16-22, carbon atoms, for example in amount 35-100%, preferably 50-100%, often 80-100%, and (ii) one or more comonomers selected from acrylic acid, methacrylic acid, and esters of acrylic or methacrylic acid in which the esterifying group contains less than 10 carbon atoms. The polymer can be a block copolymer in which one of blocks is a crystalline polymer as defined and the other block(s) is crystalline or amorphous. Preferred block copolymers comprise polysiloxane polymeric blocks, and (ii) crystalline polymeric blocks having a $T_p$ of −5 to 40° C. Such a polymer can be prepared by copolymerizing a mixture of reactants which comprises (i) at least one n-alkyl acrylate or methacrylate in which the n-alkyl group contains at least 12 carbon atoms and (ii) a polysiloxane having a copolymerizable group at one end thereof.

Other polymers which can be used to the coat the microporous film include cis-polybutadiene, poly(4-methylpentene), polydimethyl siloxane, and ethylene-propylene rubber.

The gas-permeable membrane optionally has one or more of the following
properties
(i) a $P_{10}$ ratio, over at least one 10° C. range between −5 and 15° C. or between 10 and 20° C., of at least 2.0 to 2.8;
(ii) an oxygen permeability at all temperatures between 20° and 25° C. of 2,480,000 to 7,000,000 ml/m².atm.24 hr. (160,000 to 450,000 cc/100 in².atm.24 hr); and
(iii) an R ratio of at least 2.0, preferably at least 3.0, particularly at least 3.5.

Ripening Bananas in an Ethylene Atmosphere

In the second aspects of the invention, green bananas are ripened while in a sealed container. This method can be carried out in a conventional ripening room containing ethylene, typically but not necessarily at a concentration of 500 to 1000 ppm. It was surprising to discover that, when using suitable containers, it was unnecessary to follow the conventional practice of opening the bags, and that the bananas would ripen satisfactorily in this way. An important advantage of this method of ripening bananas is that the ripening takes place in a more controlled fashion, resulting in lower peak temperatures in the bananas, which in turn results in reduced dehydration of the bananas and reduced demand upon the refrigeration equipment when the ripening is carried out at temperatures below room temperature.

The temperature at which ripening is carried out and the concentration of ethylene in the atmosphere influence the rate at which ripening takes place. In general, slower ripening results in bananas which remain in a desired range of color stage for a longer period. On the other hand, this must be balanced against delivery dates required by retail outlets and inventory constraints. Generally the ethylene-containing atmosphere will be maintained at the temperature less than 22° C., preferably less than 20° C., for example 16-21° C.

The atmosphere within the bags will change substantially during the ripening process, as the bananas consume $O_2$ and generate $CO_2$. Preferably, the packaging atmosphere, for at least part of the period before the bananas reach their climacteric, contains at least 10% preferably at least 12%, particularly 14 to 19%, of $O_2$, and less than 10%, preferably less than 4%, of $CO_2$, with the total quantity of $O_2$ and $CO_2$ being less than 20%, preferably less than 17%. For at least part of the period after the bananas have passed their climacteric, the packaging atmosphere preferably contains at least 0.8%, preferably 1.5 to 6%, especially 1.5 to 3%, of $O_2$, and less than 15%, preferably less than 7%, of $CO_2$, with the total quantity of $O_2$ and $CO_2$ being less than 16%, preferably less than 10%.

Ripening Bananas Using a Source of Ethylene within the Container

In the third and sixth aspects of the invention, green bananas are ripened by means of a source of ethylene placed with the bananas in the sealed container. This aspect of the invention is particularly useful for ripening bananas while they are being transported, for example on a ship. The ripening process can be controlled so that the bananas are at a desired color stage when the bananas reach their destination. During the ripening process, there is no need to alter the normal atmosphere in which the bags of bananas are being transported (though the invention does not exclude the possibility that a controlled atmosphere is used). The source of ethylene can make ethylene available immediately after packaging the bananas, or after a desired delay.

In these aspects of the invention, relatively slow ripening of the bananas is generally desired, and in consequence the temperature around the bags of bananas is generally controlled, during at least part of the ripening process, at a temperature less than 18° C., preferably less than 16° C., for example at 14-15° C.

Any convenient source of ethylene can be used. I have obtained good results using 2-chloroethyl phosphonic acid, which is often referred to herein as 2CPA. 2CPA can be used in the form of an aqueous solution, for example of concentration 3-4%. The rate at which 2CPA generates ethylene increases with increasing pH of the aqueous solution, which can be adjusted, for example to more than 4, particularly more than 7, by the addition of suitable materials, for example buffer solutions and/or sodium bicarbonate solutions. In one embodiment, a 2CPA solution and any pH adjuster are adsorbed on the same or different absorbent pads, e.g. paper pads, and the pad(s) placed in the bottom of the bag and covered with a polymeric sheet before the bananas are placed in the bag. In another embodiment, a solution of 2CPA is applied to the green bananas, for example by dipping or spraying, before the bananas are placed in the bag.

As in the aspects of the invention which involve ripening in an ethylene-containing atmosphere, the atmosphere within the sealed bags containing the source of ethylene will change during the ripening process. The atmospheres in the bag, for at least part of the periods before and after the climacteric, are preferably as stated above when the bananas are ripened in an ethylene-containing atmosphere.

Quantities of Bananas

The invention can in principle be used for any quantity of bananas. However, when the invention is used for ripening bananas, or for storing green bananas, it is particularly valuable when relatively large quantities are involved. Thus, the sealed container can contain at least 4 kg, preferably least 15 kg, especially 16 to 22 kg of bananas. However, in the sixth aspect of the invention, much smaller quantities (1 to 2.5 kg (2 to 5 lb.) are used in order to increase the shelf life of the bananas at a desired color stage.

EXAMPLES

The invention is illustrated in the following Examples, a number of which are comparative Examples, designated by the letter C before the number of the example. The bananas, bags and control members used in the Examples were as follows.

Bananas

The bananas were Cavendish bananas, from Ecuador in Examples 1A-B, C11-12, 2, C2, 4A-B and C41-42, from Costa Rica in Examples 5A-C and C5, and from Colombia in the other Examples.

Bags

The large bags were about 0.96 m (38 in.) wide and about 1.2 m (50 in.) long, and were made from polyethylene film about 0.056 mm (2.2 mil) thick (available from Roplast Industries under the tradename RA 3030). The polyethylene film had an OTR at 13° C. of about 2915 (188) and at 22° C. of about 4,650 (300), and EtTR at 13° C. of about 11,400 (735) and at 22° C. of about 18,100 (1,170), an R ratio of about 4.5, and a P10 ratio (between 0 and 10° C.) of about 1.76. The small bags were about 0.3 m (12 in.) wide and about 0.46 m (18 in.) long, and were made from the same polyethylene film.

Control Members

The Type S control members were as described in U.S. Pat. No. 6,548,132 (Clarke) and comprised a microporous polyethylene film coated with a polysiloxane/SCC block copolymer. The Type S members had an OTR at 13° C. of about 3,803,850 (245,410) and at 22° C. of about 5,000,000 (324,000), an EtTR at 13° C. of about 16,280,000 (1,050,300) and at 22° C. of about 19,500,000 (1,260,000), an R ratio of about 3.8, and a P10 ratio (between 0 and 10° C.) of about 1.8. The microporous polyethylene film contained 50-60% silica, had a thickness of about 0.18 mm (0.007 inch), a tear strength of about 90 g, a porosity of about 65%, an average pore size of about 0.1 micron and a largest pore size of 4-10 microns (available from PPG industries under the tradename Teslin SP 7). The block copolymer was prepared by the reaction of a polydimethyl siloxane terminated one end only by a methacryloxypropyl group (available from Gelest under the tradename MCR M17), 40 parts, dodecyl acrylate, 26.8 parts and tetradecyl acrylate, 33.2 parts, as described in Example A7 of U.S. application Ser. No. 09/121,082 and corresponding International Publication No. WO 00/04787.

The Type A control members were as described in copending commonly assigned U.S. Pat. No. 6,376,032 (Clarke), which is incorporated herein by reference in its entirety.

In each Example, the control member was secured to a portion of the bag in which one or more round holes had been cut. The effective area of the control member is about equal to the area of the hole or holes in the portion of the bag to which the control member is attached. However, in Examples 1A-B, C11-12, 2, C2, 3A-D and C31-33, the periphery of the control member was heat sealed to the interior of the bag, thus creating a control member of the kind described in U.S. Pat. No. 6,013,293. In the other Examples, the control member was secured to the exterior of the bag by means of a layer of a pressure sensitive adhesive on the peripheral margin of the control member.

The color stages referred to in the Examples are those accepted by the industry and as shown below.

| Color stage | Description |
|---|---|
| 1 | 95% green |
| 2 | 80% green, 20% slightly yellow |
| 3 | 50% yellow, 50% green |
| 4 | 80% yellow, 20% light green |
| 5 | 95% yellow, with slight green color at stem and blossom end |
| 6 | 100% yellow |
| 7 | 100% yellow with brown sugar spots |

Bananas are preferably at color stage 3.5 to 5 when put on retail sale.

Many of the Examples are summarized in Tables 1-8 below. In the Tables, when more than one result is given for a particular Example, this reflects the fact that more than one test was carried out under the same conditions.

Examples 1A-B, C11-12, 2 and C2

Each of these Examples uses a large bag. In Examples C 11, 1A-B and 2, each bag has one S-type control member placed under two or more holes in the bag. In Example C11, the control member had an area of 1935 mm² (3 in²) and was placed under two holes, each of diameter 20.6 mm (0.81 in.). In Example 1A, the control member had an area of 6450 mm² (10 in²) and was placed under 6 holes, each of diameter 20.6 mm (0.81 in.). In Examples 1B and 2, the control member had an area of 12,900 mm² (20 in²) and was placed under 6 holes, each of diameter 28.7 mm (1.13 in). Each bag was packed with about 20 kg (44 lb) of green bananas. The bananas had been harvested at week 11 and maintained at 13-14° C. for about 11 days after harvest before being packed. Except in Examples C12 and C2, excess air was extracted from the bags using a vacuum pump, and the bags were then sealed using tie wraps. In Examples C12 and C2, the bags were left open. The bags were maintained at 13° C. for an extended time, Examples 1A, 1B, C11 and C12 being terminated at day 62, and Examples 2 and C2 being terminated at day 40. The results are given in Table 1 below. In Example 2, traces of ethylene (generated by the ripening of the bananas) remained in the test chamber from Example 1 and caused the bananas to ripen more rapidly than in the otherwise substantially identical Example 1B. This demonstrates the desirability of excluding ethylene when long storage periods are needed (and conversely, the ability to accelerate ripening when desired).

TABLE 1

|  |  | Example No. | | | | | |
|---|---|---|---|---|---|---|---|
|  |  | C11 | 1A | 1B | C12 | 2 | C2 |
| Control member | | yes | yes | yes | no | yes | no |
| Total area of holes in bag under control members (mm²) | | 670 | 2000 | 3880 | — | 3880 | — |
| Color stages | | | | | | | |
| first change at day | | >62 | 44 | 44 | 12 | 26 | 15 |
| days to change from 3.5 to 4.5 | | — | — | — | — | 4.5 | * |
| days to change from 3.5 to 5 | | — | ** | 11 | 7 | # | * |
| Weight loss (%) | on day 26 | — | — | — | — | 0.35 | 3.7 |
|  | on day 41 | 0.38 | 0.45 | 0.60 | 4.73 | — | — |
| Taste and texture | on day 40 | — | — | — | — | Exct | ♦ |
|  | on day 62 | UGH | Exct | Exct | Overripe | — | — |

TABLE 1-continued

| | Example No. | | | | | |
|---|---|---|---|---|---|---|
| | C11 | 1A | 1B | C12 | 2 | C2 |
| % $O_2$ (approximate) | | | | | | |
| at day 7 | 5.1 | 11.9 | 13.8 | atm | — | atm |
| at day 8 | — | — | — | atm | 14.35 | atm |
| at day 47 (after climacteric) | 5.0 | 0.96 | 2.2 | atm | 2.15 | atm |
| % $CO_2$ (approximate) | | | | | | |
| at day 7 | 5.3 | 3.6 | 3.05 | atm | — | atmt |
| at day 8 | — | — | — | atm | 3.05 | atm |
| at day 29 (after climacteric) | — | — | — | atm | 8.0 | atm |
| at day 47 (after climacteric | 5.3 | 7.9 | 8.4 | atm | — | atm |

UGH unripe, green and hard.
* the bananas had a color of 4.5 when the test was terminated at day 62
Exct excellent taste and texture
test terminated at this point; extrapolation indicates that time to change from color 3.5 to 5 would be 5.9 days.
♦ Bananas removed on day 26 because they were over-ripe.

Examples 3 and C31-33

Each of these Examples uses a large bag. In Examples C31-33 and 3, each bag has one S-type control member placed under one or more holes in the bag. In Example C31, the control member had an area of 967 mm² (1.5 in²) and was placed under a single hole of diameter 20.6 mm (0.81 in.). In Example C32, the control member had an area of 1935 mm² (3 in²) and was placed under 2 holes, each of diameter 20.6 mm (0.81 in.). In Example C33, the control member had an area of 3225 mm² (5 in²) and was placed under 4 holes, each of diameter 19 mm (0.75 in.). In Example 3, the control member had an area of 12,900 mm² (20 in²) and was placed under 6 holes, each of diameter 25 mm (1 in.). In Example C34, the bag did not have a control member. Each bag was packed with about 18.1 kg (40 lb) of green bananas. The bananas had been harvested at week 13, and maintained at 13-14° C. for about 11 days after harvest before being packed. Except in Example C34, excess air was extracted from the bags using a vacuum pump, and then securely tied (the bags were not, however, as completely sealed as in Examples 1 and 2). In Example C34, the bags were left open. The sealed bags were cooled to about 13° C. and shipped to Gulfport, Miss., and then to San Francisco, Calif., maintaining the temperature at about 13° C. In San Francisco, 36 days after packing, half the bags in each Example were opened, and the other half left intact. All the bags were then exposed to ethylene (500-1000 ppm) in a commercial ripening room for about 24 hours. The bananas in the opened bags ripened rapidly in the expected way; thus by day 43, their color was 6, by day 46 their color was greater than 7, and by day 49, they were overripe. The bags which were still sealed were opened on day 49. The results for the bags opened on day 49 are shown in Table 2 below. These Examples demonstrate that bananas harvested at 13 weeks can be transported in a suitably designed bag, and can be ripened into an excellent product by exposure to ethylene, either through the bag or after opening the bag.

TABLE 2

| | Example No. | | | | |
|---|---|---|---|---|---|
| | C31 | C32 | C33 | 3 | C 34 |
| Control member | yes | yes | yes | yes | no |
| Total area of hole(s) in bag under control member (mm²) | 335 | 670 | 1140 | 3040 | — |

TABLE 2-continued

| | Example No. | | | | |
|---|---|---|---|---|---|
| | C31 | C32 | C33 | 3 | C 34 |
| Days to change from color stage 3.5 to color stage 5 | >8 | >8 | >8 | 5.5 | DDU |
| Taste and texture on day 49 | SGU | SGU | SGU | Exct | DDU |
| % $O_2$ (approximate) at day 23 | 8.6 | 9.8 | 12.7 | 15.5 | |
| at day 46 | 2.9 | 0.6 | 1.8 | 2.2 | |
| % $CO_2$ (approximate) at day 23 | 4.45 | 3.65 | 3.3 | 2.85 | |
| at day 46 | 13.8 | 11.4 | 5.0 | 9.0 | |

SGU soft, green and unpalatable
DDU dehydrated, decayed and unpalatable by day 47 (day 11 after exposure to ethylene
Exct excellent taste and texture Examples 4A, 4B, C41 and C42

Each of these Examples uses a small bag. In Examples 4A-B, each bag has one A-type control member placed over four or five holes in the bag. In Example 4A, the control member had an area of 145 mm² (5.7 in²) and was placed over four holes each of diameter 19 mm (0.75 in.). In Example 4B, the control member had an area of 4516 mm² (7 in²) and was placed over 5 holes, each of diameter 19 mm (0.75 in.). In Example C41, the control member and the holes under it were as in Example 4A, except that the control member was an uncoated microporous film. In Example C42, the bag was intact except for 200 pinholes each about 0.5 mm (26 gauge) in diameter. Each bag was packed with about 1.35 kg (3 lb) of green bananas which had been maintained at 13-14° C. for about 11 days after harvest. Except in Example C42, excess air was extracted from the bags using a vacuum pump, and the bags were then securely tied. In Example C42, the bags were left open. After three days, to allow the packaging atmosphere to equilibrate, the bags were exposed to ethylene (500-1000 ppm) in a ripening room. The results are shown in Table 3 below. These Examples demonstrate that small quantities of bananas can be ripened in a suitably designed bag, and can remain in the bag in excellent condition for several days longer than bananas exposed to the air.

TABLE 3

| | Example No. | | | |
|---|---|---|---|---|
| | 4A | 4B | C41 | C42 |
| Control member | yes | yes | ♠ | no |
| Total area of holes in bag over control member (mm²) | 1140 | 1425 | 1140 | — |
| Color stage on day 10 after ethylene treatment | 4.0 | 4.4 | 7.0 | 6.8 |
| Weight loss (%) on day 10 after ethylene treatment | 0.57 | 0.72 | 1.05 | 0.61 |
| Taste & texture on day 10 after ethylene treatment | Exct | Exct | Over-ripe | Over-ripe |

♠ uncoated microporous film
Exct excellent taste and texture

Examples 5A, 5B, 5C and C5

These Examples show that the bananas generate heat more evenly when ripened in a container including an atmosphere control member. In each Example, a large bag was packed with about 18.1 kg (40 lb.) of green bananas. The green bananas had been harvested 13 days previously and had been stored at 13-14° C. since harvest. A temperature sensor (available from Sensitech, Beverly, Mass., under the tradename Temptale P) was inserted into one banana in each bag. In each of Examples 5A, 5B and 5C, the bag had two S-type control members, each having an area of 11,300 mm² (17.5 in²). Each control member was placed over a single hole in the bag, the hole having a diameter of 70 mm (2.75 in.) in Example 5A, 74.4 mm (2.93 in.) in Example 5B, and 78.7 mm (3.1 in.) in Example 5C. In Example C5, the bag was perforated so that the bananas were surrounded by air. The bags were then sealed with rubber bands. The sealed bags were placed in a refrigerated room at about 13° C. After about 84 hours, the temperature of the room was raised to about 16.7° C. and after about 12 hours, an ethylene generator was used to provide an initial ethylene concentration in the room of 500-1000 ppm. About 24 hours after the generation of ethylene had begun, the room was vented. The temperature of the bananas was monitored for about 15 days, and reached a peak at about 60 hours after the generation of ethylene had begun. At that time, the concentration of $O_2$ and $CO_2$ was measured. The results are shown in Table 4 below. It will be seen that the peak temperature was substantially lower in the bags containing control members than in the perforated bag.

TABLE 4

| | Example No. | | | |
|---|---|---|---|---|
| | 5A | 5B | 5C | C5 |
| Control member | yes | yes | yes | no |
| Total area of holes in bag under control members (mm²) | 7700 | 8700 | 9700 | — |
| Temperature (° C.) of bananas 12 hrs after temperature of room was set to 16.7° C. | 16.3 | 15.9 | 15.7 | 16.6 |
| Peak Temperature ° C. | 21.2 | 21.1 | 20.9 | 23.9 |
| Difference between peak temperature and 16.6° C. | 4.9 | 5.3 | 5.2 | 7.3 |
| % $O_2$ 60 hours after injection of ethylene | 2.2 | 1.75 | 1.9 | 20.95 |
| % $CO_2$ 60 hours after injection of ethylene | 7.95 | 6.1 | 7.4 | 0.03 |

Examples 6A-E

Each of these Examples uses a large bag having two S-type control members, each control member having an area of 11,300 mm² (17.5 in²). Each control member was placed over seven holes in the bag, each hole of diameter 25.4 mm (1 in.). A paper pad about 300×400 mm (12×16 in.) impregnated with an aqueous solution of 2CPA (3.9%) was placed in the bottom of each bag and covered with a sheet of polyethylene. The amount of the solution varied from Example to Example, and is shown in Table 5 below. About 18.1 kg (40 lb.) of green bananas were then placed in each bag, and the bags were sealed with rubber bands. The green bananas had been maintained at 13-14° C. for about 11 days after harvest. The sealed bags were left in a cold room at 13-14° C. The color stage of the bananas was monitored, and Table 5 below shows the time in days taken to reach color stages 4 and 5.5.

TABLE 5

| | Example No. | | | | |
|---|---|---|---|---|---|
| | 6A | 6B | 6C | 6D | 6E |
| Control member | yes | yes | yes | yes | yes |
| Total area of holes in bag under control members (mm²) | 7100 | 7100 | 7100 | 7100 | 7100 |
| mL of 3.9% 2CPA solution on paper pad | 30 | 50 | 100 | 200 | 500 |
| Days to color stage 4 | 11 | 10.8 | 10.6 | 11 | 9.6 |
| | * | 20.4 | 20.1 | 12 | 12 |
| | * | 10.5 | 11 | 11 | 11 |
| Days to color stage 5.5 | 17.5 | * | 17.4 | 16 | 16.1 |
| | * | * | 24.2 | 16 | 16.9 |
| | * | 17.5 | 17.4 | 16 | 16.3 |
| Days from color stage 4 to color stage 5.5 | 6.5 | — | 6.8 | 5 | 6.5 |
| | — | — | 3.1 | 4 | 4.9 |
| | — | 7 | 6.4 | 5 | 5.3 |

* this color stage had not been reached when the experiment was terminated after 27 days.

Examples 7A-D and C71-74

The procedure of Example 6 was followed except for the changes noted below.

1. In Examples 7A-D, there was a single hole, diameter 82.5 mm (3.25 in.), under each of the two control members. The total area of the holes was 10,700 mm².

2. In Examples 7A, 7B and 7C and in comparative Examples C72 and C73, a paper pad impregnated with 0.1N $NaHCO_3$ solution was placed adjacent to the paper pad impregnated with 2CPA solution, thus increasing the pH of the 2CPA solution and increasing the rate at which ethylene was generated. The amount of the $NaHCO_3$ solution varied from Example to Example as shown in Table 6 below.

3. In Examples 7D and C74, 2CPA was not used, but three days after packing, the bags were exposed to ethylene for 24 hours in a conventional ripening room at 16.7° C. and containing 500-1000 ppm of ethylene.

4. Comparative Examples C71-74 were carried out in which no ethylene was used (C71), or the bag was sealed but did not have a control member (C 72-73), or the bag was not sealed (C74).

5. The ethylene concentration in the bags was measured at various times after packing.

The results obtained are shown in Table 6 below.

TABLE 6

| | 7A | 7B | 7C | 7D | C71 | C72 | C73 | C74 |
|---|---|---|---|---|---|---|---|---|
| Control member | yes | yes | yes | yes | yes | no | no | no |
| mL 3.9% 2CPA solution | 30 | 30 | 30 | no | no | 30 | 30 | no |
| mL 0.1N NaHCO$_3$ | 15 | 30 | 60 | no | no | 13 | 30 | no |
| Exposed to ethylene in ripening room | no | no | no | yes | no | no | no | yes |
| Days to color stage 4 | 12 | 10.2 | 6.2 | 6.5 | | | | 4.2 |
| | 12.5 | 10.2 | 9.4 | 6.5 | | | | 4.5 |
| | 15 | 8.4 | 9.8 | 7.1 | | | | 4.5 |
| Days to color stage 5.5 | * | * | 9.5 | 11.5 | | | | 6.6 |
| | * | * | 12.5 | 12 | | | | 7 |
| | * | * | 12.9 | 12.3 | | | | 7.2 |
| Days from color stage 4 to color stage 5.5 | — | — | 3.3 | 5 | | | | 2.4 |
| | — | — | 3.1 | 5.5 | | | | 2.5 |
| | — | — | 3.1 | 5.2 | | | | 2.7 |
| Color after 15 days | | | | | 2 | 2 | 2 | |
| ppm ethylene | | | | | | | | |

TABLE 6-continued

| | 7A | 7B | 7C | 7D | C71 | C72 | C73 | C74 |
|---|---|---|---|---|---|---|---|---|
| after | | | | | | | | |
| 0 hrs | 0.47 | 4.11 | 8.65 | | | 5.72 | 10.7 | |
| 7 hrs | 0.58 | 2.36 | 10.04 | | | 7.81 | 13.35 | |
| 72 hrs | 0.68 | 1.94 | 6.66 | | | 10.85 | 20.51 | |
| 79 hrs | — | 3.28 | 4.7 | | | 9.43 | 16.65 | |
| % O$_2$ after 15 days | 3.73 | 3.97 | 3.72 | | | 0.21 | 0.34 | |
| % CO$_2$ after 15 days | 6.23 | 6.2 | 4.67 | | | 27.3 | 25.5 | |

* this color stage had not been reached when the experiment was terminated.

Examples 8A-J and C81-83

Examples 8A-J and C 81-83 followed the same procedure as Examples 7A-C and C71-74 except for the changes noted below.

1. The ethylene, O$_2$ and CO$_2$ concentrations were determined at different times.

2. In some of the examples, the second paper pad was impregnated with 30 mL of an aqueous buffer solution (i) containing potassium phthalate and having a pH of 4, (ii) containing dibasic sodium phosphate, monobasic potassium phosphate, sodium chromate and potassium dichromate, and having a pH of 7, or (iii) containing sodium carbonate and sodium bicarbonate and having a pH of 10. These buffer solutions are available from Orion Research Inc., Beverley, Mass. USA 3. In Examples 8H and C83, the bag was taken to the ripening room 3 days after packing.

4. In Example 8G, the sealed bags were left in a room at about 21° C. (in the other Examples, the room was at 13-14° C.).

5. In Example C83, the bag was not sealed.

The results are shown in Table 7 below.

TABLE 7

| | 8A | 8B | 8C | 8D | 8E | 8F | 8G | 8H | C81 | C82 | C83 |
|---|---|---|---|---|---|---|---|---|---|---|---|
| Control member | yes | yes | yes | yes | yes | yes | yes | yes | yes | no | no |
| mL 3.9% 2CPA solution | 30 | 30 | 30 | 30 | 30 | 30 | 30 | no | no | 30 | no |
| mL 0.1N NaHCO$_3$ | no | no | no | 45 | 60 | 75 | 60 | no | no | 60 | no |
| 30 mL of buffer having | pH 4 | pH 7 | pH 10 | no | no | no | no | no | no | no | no |
| Exposed to ethylene in ripening room | no | no | no | no | no | no | no | yes | no | no | yes |
| Days to color stage 4 | 11.9 | 15.4 | 13.1 | 9.4 | 8.5 | 9.0 | 8.2 | 7.7 | * | * | 3.7 |
| | 13.0 | 11.3 | 11.5 | 9.0 | 9.3 | 8.1 | 7.6 | — | — | — | 3.9 |
| | 14.3 | 10.1 | 10.8 | 10.1 | 8.0 | 8.1 | 6.7 | 10.6 | — | — | 3.9 |
| Days to color stage 5.5 | — | — | — | 15.7 | 13.8 | 12.4 | 14.8 | 14 | * | * | 5 |
| | — | 15.3 | — | 12.3 | 13.1 | 11.4 | 12.2 | — | — | * | 6 |
| | — | — | 16.6 | 15 | 11.9 | 11.4 | 9.0 | * | — | — | 6 |
| Days from color stage 4 to color stage 5.5 | * | * | — | 6.3 | 5.3 | 3.4 | 6.2 | 6.3 | — | — | 1.3 |
| | * | 4 | — | 3.3 | 3.8 | 3.3 | 4.6 | — | — | — | 2.1 |
| | * | * | 5.8 | 4.9 | 3.9 | 3.3 | 2.3 | — | — | — | 2.1 |
| ppm ethylene after 24 hrs | 0.88 | 1.67 | 1.37 | 3.25 | 4.39 | 5.58 | 10.9 | 0.49 | 0.39 | 39.5 | 0 |
| % O$_2$ after 8 days | 3.72 | 5.58 | 2.93 | 3.2 | 2.39 | 2.52 | 1.95 | 2.97 | 17 | 0.3 | — |
| % CO$_2$ after 8 days | 4.73 | 4.7 | 5.3 | 4.97 | 5.13 | 5.47 | 7.97 | 4.73 | 1 | 17.6 | — |

* this color stage had not been reached when the experiment was terminated after 17 days.

Examples 9A-C and C91-92

The procedure of Example 6 was followed, except for the changes noted below.

1. There was a single hole, diameter 82.5 mm (3.25 in.), under each control member. The total area of the hole was 5350 mm$^2$.

2. No 2CPA-impregnated paper pad was placed in the bag.

3. The bananas, before being packed into the bag, were dipped into a dilute aqueous solution of 2CPA. The concentration of the 2CPA varied from Example to Example as shown in Table 8 below.

4. Comparative Examples C91 and C92 were carried out in which the bag did not have a control member (C91) or the bananas were not treated with 2CPA solution (C92). Comparative Example C91 is the same as the comparative Example C71.

The results obtained are shown in Table 8 below.

TABLE 8

| | Example No. | | | |
|---|---|---|---|---|
| | 9A | 9B | C91 | C92 |
| Control Member | yes | yes | no | yes |
| Concentration of 2CPA (ppm) | 1116 | 128 | 1116 | 0 |
| Days to color stage 4 | 11.9 | 14.6 | * | * |
| | 10 | * | * | * |
| | 11.9 | 11 | * | * |
| Days to color stage 5.5 | * | * | * | * |
| | * | * | * | * |
| | * | * | * | * |

* this color stage had not been reached when the experiment was terminated after 27 days Table 9 below shows, for each of the bags in Examples 5A-C, 6A-E and 7A-E, the permeability of the bag to $O_2$ and to ethylene ("Et" in Table 9), and the respective contributions of the control member and the remainder of the bag. For this calculation, the size of the bag, after sealing, was assumed to be 0.96×1.04 m (38 in.×41 in.), i.e. to have a total area of 2 m² (3115 in²).

TABLE 9

| Example No. | Perm. of bag (mL/atm. 24 hr) at 13° C. | Perm. of bag at 13° C./kg of bananas | Hole area (m²) | Perm. Of ACM at 13° C. | Perm. of rest of bag at 13° C. |
|---|---|---|---|---|---|
| C11 | $O_2$ 8,450 | $O_2$ 470 | 0.000670 | $O_2$ 2,550 | $O_2$ 5,900 |
| | Et 36,000 | Et 2,000 | | Et 10,900 | Et 25,100 |
| 1A | $O_2$ 13,500 | $O_2$ 745 | 0.002000 | $O_2$ 7,600 | $O_2$ 5,900 |
| | Et 57,650 | Et 3,185 | | Et 32,550 | Et 25,100 |
| 1B | $O_2$ 20,650 | $O_2$ 1,140 | 0.003880 | $O_2$ 14,750 | $O_2$ 5,900 |
| | Et 88,250 | Et 4,875 | | Et 63,130 | Et 25,100 |
| 2 | $O_2$ 20,650 | $O_2$ 1,140 | 0.003880 | $O_2$ 14,750 | $O_2$ 5,900 |
| | Et 88,250 | Et 4,875 | | Et 63,130 | Et 25,100 |
| C31 | $O_2$ 7,200 | $O_2$ 395 | 0.000335 | $O_2$ 1,300 | $O_2$ 5,900 |
| | Et 30,650 | Et 1,695 | | Et 5,500 | Et 25,100 |
| C32 | $O_2$ 8,500 | $O_2$ 470 | 0.000670 | $O_2$ 2,550 | $O_2$ 5,900 |
| | Et 36,000 | Et 2,000 | | Et 10,900 | Et 25,100 |
| C33 | $O_2$ 10,250 | $O_2$ 565 | 0.001140 | $O_2$ 4,350 | $O_2$ 5,900 |
| | Et 43,650 | Et 2,400 | | Et 18,550 | Et 25,100 |
| 3 | $O_2$ 17,450 | $O_2$ 965 | 0.003040 | $O_2$ 11,550 | $O_2$ 5,900 |
| | Et 74,600 | Et 4,120 | | Et 49,500 | Et 25,100 |
| 5 A | $O_2$ 35,000 | $O_2$ 1,935 | 0.007700 | $O_2$ 29,100 | $O_2$ 5,900 |
| | Et 149,800 | Et 8,280 | | Et 124,700 | Et 25,100 |
| 5B | $O_2$ 39,000 | $O_2$ 2,155 | 0.008700 | $O_2$ 33,100 | $O_2$ 5,900 |
| | Et 166,650 | Et 9,200 | | Et 141,550 | Et 25,100 |
| 5C | $O_2$ 42,900 | $O_2$ 2,370 | 0.009700 | $O_2$ 37,000 | $O_2$ 5,900 |
| | Et 183,550 | Et 10,150 | | Et 158,450 | Et 25,100 |
| 6 A-E | $O_2$ 32,840 | $O_2$ 1,815 | 0.007100 | $O_2$ 26,940 | $O_2$ 5,900 |
| | Et 140,500 | Et 7,750 | | Et 115,400 | Et 25,100 |
| 7 A-E | $O_2$ 46,500 | $O_2$ 2,570 | 0.010700 | $O_2$ 40,600 | $O_2$ 5,900 |
| | Et 199,200 | Et 11,000 | | Et 174,100 | Et 25,100 |

What is claimed is:

1. A sealed container which comprises
   (a) at least 15 kg of bananas which have not yet reached their climacteric,
   (b) a packaging atmosphere around the bananas, the packaging atmosphere containing at least 10% of oxygen and less than 10% of carbon dioxide, with the total quantity of oxygen and carbon dioxide being less than 20%, and
   (c) an atmosphere control member which
      (i) provides a pathway for oxygen, carbon dioxide and ethylene to enter or leave the packaging atmosphere, and
      (ii) consists of a membrane which comprises a microporous film and a polymeric coating on the microporous film,
   the sealed container having (i) an oxygen permeability at 13° C. per kilogram of bananas in the container (OP13/kg) of at least 700, (ii) an ethylene permeability at 13° C. per kilogram of bananas in the container (EtP13/kg) which is at least 2 times the OP13/kg, and (iii) an R ratio at 13° C. of at least 2.

2. A sealed container according to claim 1 wherein the OP13/kg is at least 1500 and the EtP13/kg is at least 3 times the OP13/kg.

3. A sealed container according to claim 1 wherein the atmosphere control member has an R ratio at 13° C. of at least 3.5.

4. A sealed container according to claim 1 wherein the packaging atmosphere contains at least 12% of oxygen and less than 10% of carbon dioxide, with the total quantity of oxygen and carbon dioxide being less than 20%.

5. A sealed container according to claim 4 wherein the packaging atmosphere contains 14-19% of oxygen and less than 4% of carbon dioxide.

6. A sealed container according to claim 5 wherein the total quantity of oxygen and carbon dioxide is less than 17%.

7. A sealed container according to claim 1 wherein the atmosphere control member has a $P_{10}$ ratio over at least one 10° C. range between 10 and 20° C. of at least 2.0.

8. A sealed container according to claim 1 wherein the membrane has an oxygen permeability (OTR), at all temperatures between 20° and 25° C., of at least 50,000 cc/100 inch² .atm.24 hrs.

9. A sealed container according to claim 1 wherein the membrane has an oxygen permeability (OTR), at all temperatures between 20° and 25° C., of 100,000 to 250,000 cc/100 inch² .atm.24 hrs.

10. A sealed container which comprises
   (a) at least 15 kg of bananas which have passed their climacteric,
   (b) a packaging atmosphere around the bananas, the packaging atmosphere containing 1.5 to 6% of oxygen and less than 15% of carbon dioxide, with the total quantity of oxygen and carbon dioxide being less than 16%, and (c) an atmosphere control member which
  (i) provides a pathway for oxygen, carbon dioxide and ethylene to enter or leave the packaging atmosphere, and
  (ii) consists of a membrane which comprises a microporous film and a polymeric coating on the microporous film, the sealed container having (i) an oxygen permeability at 13° C. per kilogram of bananas in the container (OP13/kg) of at least 700, (ii) an ethylene permeability at 13° C. per kilogram of bananas in the container (EtP13/kg) which is at least 2 times the OP13/kg, and (iii) an R ratio at 13° C. of at least 2.

11. A sealed container according to claim 10 wherein the packaging atmosphere contains 1.5-3% of oxygen and less than 7% of carbon dioxide.

12. A sealed container according to claim 10 wherein the bananas have been exposed to ethylene in a ripening room.

13. A sealed container according to claim 10 wherein the membrane has an oxygen permeability (OTR), at all temperatures between 20° and 25° C., of at least 50,000 cc/100 inch² .atm.24 hrs.

14. A sealed container according to claim 10 wherein the membrane has an oxygen permeability (OTR), at all temperatures between 20° and 25° C., of 100,000 to 250,000 cc/100 inch² .atm.24 hrs.

15. A sealed package which comprises a sealed container which
  (a) comprises walls which are relatively impervious to gases,
  (b) contains at least 15 kg of bananas which have not yet reached their climacteric and a packaging atmosphere around the bananas, the packaging atmosphere being at a temperature of 13-18° C., and
  (c) at least one control section which is provided by an atmosphere control member which
    (i) provides a pathway for oxygen, carbon dioxide and ethylene to enter or leave the packaging atmosphere,
    (ii) consists of a membrane which comprises a microporous film and a polymeric coating on the microporous film, and which has an oxygen permeability (OTR), at all temperatures between 20° and 25° C., of at least 50,000 cc/100 inch² .atm.24 hrs,
    (iii) extends across a complete dimension of the sealed container;

the sealing of the sealed container being a non-hermetic seal which permits equilibration of pressures inside and outside the sealed container, and the sealed container having
  (i) an oxygen permeability at 13° C. per kilogram of bananas in the container (OP13/kg) of at least 700,
  (ii) an ethylene permeability at 13° C. per kilogram of bananas in the container (EtP13/kg) which is at least 2 times the OP13/kg, and
  (iii) an R ratio at 13° C. of at least 2.

16. A sealed container according to claim 15 wherein the OP13/kg is at least 1500 and the EtP13/kg is at least 3 times the OP13/kg.

17. A sealed container according to claim 15 wherein the atmosphere control member has an R ratio at 13° C. of at least 3.5.

18. A sealed container according to claim 15 wherein the packaging atmosphere contains at least 10% of oxygen and less than 10% of carbon dioxide, with the total quantity of oxygen and carbon dioxide being less than 20%.

19. A sealed container according to claim 18 wherein the packaging atmosphere contains 14-19% of oxygen and less than 4% of carbon dioxide, and the total quantity of oxygen and carbon dioxide is less than 17%.

20. A sealed container according to claim 15 wherein the membrane has an oxygen permeability (OTR), at all temperatures between 20° and 25° C., of 1,550,000 to 3,875,000 ml/m² .atm.24 hrs.

21. A sealed container according to claim 15 wherein the atmosphere control member has a $P_{10}$ ratio over at least one 10° C. range between 10 and 20° C. of at least 2.0.

22. A sealed container according to claim 15 which contains at least 1500 pounds (680 kg) of bananas.

* * * * *